United States Patent

[11] 3,592,478

| [72] | Inventors | Pleasant T. Cole<br>Oxon Hill;<br>Philip A. Studer, Silver Spring; Allen L. Tyler, Baltimore, all of, Md. |
|---|---|---|
| [21] | Appl. No. | 822,534 |
| [22] | Filed | May 7, 1969 |
| [45] | Patented | July 13, 1971 |
| [73] | Assignee | The United States of America as represented by the Administrator of the National Aeronautics and Space Administration |

[54] HELICAL RECORDER ARRANGEMENT FOR MULTIPLE CHANNEL RECORDING ON BOTH SIDES OF THE TAPE
8 Claims, 5 Drawing Figs.

| [52] | U.S. Cl. | 274/4 R, 179/100.2 CA, 179/100.2 MD |
|---|---|---|
| [51] | Int. Cl. | G11b 5/78, G11b 21/02 |
| [50] | Field of Search | 179/100.2 Z, 100.2 MD, 100.2, 100.2 CA; 274/4, 11 A |

[56] References Cited
UNITED STATES PATENTS

| 2,498,746 | 2/1950 | Walker | 179/100.2 |
| 2,990,182 | 6/1961 | Cailliot | 179/100.2 |
| 3,095,200 | 6/1963 | Cailliot | 179/100.2 |
| 3,240,880 | 3/1966 | Kuehnle | 179/100.2 |
| 3,497,223 | 2/1970 | Atkins | 179/100.2 |

*Primary Examiner*—Bernard Konick
*Assistant Examiner*—Robert S. Tupper
*Attorneys*—R. F. Kempf, E. Levy and G. T. McCoy ABSTRACT: There is disclosed a recorder employing a column of tape wrapped in a helix around a supporting drum. A direct drive torquer rotates the drum-tape assembly. Tape separators and heads are mounted on a traversing system such that they are completely supported by the tape. The separators flex the tape at an angle sufficient to allow the heads to clear the tape stack. As the tape rotates, the archemides screw effect causes the heads to track up and down the tape stack thus traversing the entire length of the tape.

PATENTED JUL 13 1971

INVENTORS,
PLEASANT T. COLE
PHILIP A. STUDER
ALLEN L. TYLER

BY
Robert F. Kempf
ATTORNEYS

INVENTORS,
PLEASANT T. COLE
PHILIP A. STUDER
ALLEN L. TYLER

ATTORNEYS

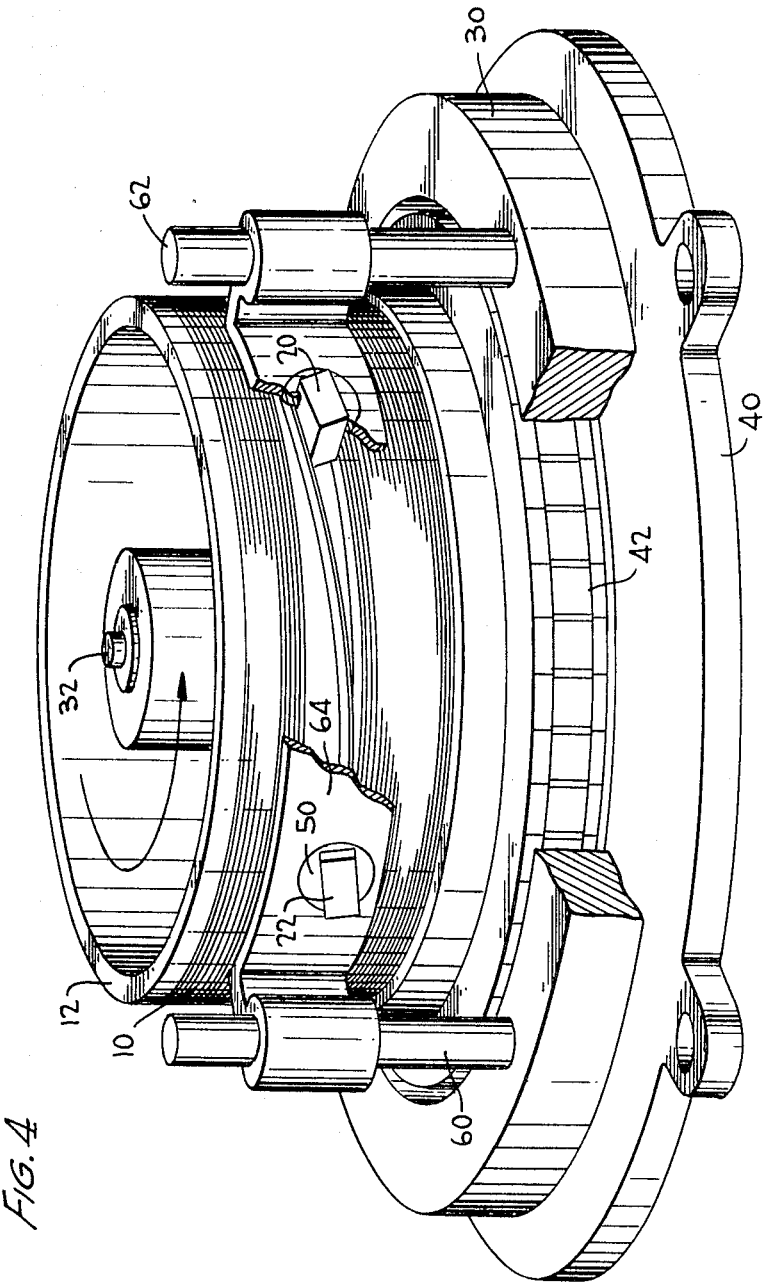

HELICAL RECORDER ARRANGEMENT FOR MULTIPLE CHANNEL RECORDING ON BOTH SIDES OF THE TAPE

The invention described herein was made by employees of the United States Government and may be manufactured and used by or for the Government of the United States of America for governmental purposes without the payment of any royalties thereon or therefore.

This invention relates to a recorder and more particularly to a high environment recorder employing a tape of helical configuration.

Recorders of this type are typically useful in remote or hazardous environments of vacuum, high temperature, vibration or shock. Typically, they can be flight recorders in aircraft, down-hole recorders in oil wells or spacecraft recorders. Obviously, however, instruments of this type, although built to withstand extreme conditions, find utility under more ordinary circumstances. A good example for purposes of illustration is the high environment recorder used as a component of a spacecraft.

Spacecraft recorders, when used in earth orbit satellites, typically store data during an entire earth orbit and return it to a receiving ground station during the relatively short time when the satellite is in radio view of the ground station. These recorders therefore have relatively slow record and fast playback characteristics. Recorders used for deep space probes, on the other hand, operate in exactly the opposite way. Data is recorded in real time at a fairly conventional rate but is played back at an extremely slow rate due to bandwidth limitations of transmission over interplanetary distances. The high ratio of record to playback speeds raises both electronic and mechanical problems in this mode of operation. In some applications, where the playback speed may be one-thousandth of the record speed, the problem is particularly severe.

Another problem that distinguishes the spacecraft recorder from a ground-based one is the extreme reliability required. Spacecraft recorders are not accessible for maintenance or for changing the recording medium and therefore the average life expectancy is about 6 months for state of the art recorders. Also, spacecraft recorders must be designed to meet restrictive weight and power requirements. A summary of these state of the art flight recorders is found in the technology survey, "Magnetic Tape Recording," SP-5038, Chapter 13. These recorders, reel to reel or endless loop recorders have yet to overcome a basic problem; their inability to isolate the tape at the record head from disturbances inherent in the reeling mechanization.

All magnetic recording techniques require large surface areas for data storage because each bit of data requires a discrete area. Conventional reel-type recorders store data on concentric layers of tape to maintain a high surface area of tape to system volume ratio. The use of reels however, requires the storage reel to run progressively faster as the tape is uncoiled and the alternate reel must at the same time be slowed down while the tape speed across the heads remains constant. Accurate control of the reel motion becomes extremely difficult since speeds, effective torque radii, and inertias are continually changing. The sophisticated mechanisms developed to maintain this constant tape speed suffers from a crucial lack of reliability due to the use of pulleys, idlers, pinch rollers and complex mechanical movements.

In the prior art, devices are known utilizing a helical tape as an element of a recorder. However, all of these devices suffer from the same already noted defects as reel-type recorders when used as spacecraft equipment. Two patents to Cailliot disclose the use of a helicoid recording surface and describe two relatively crude recorders. The recorders shown in these U.S. Pat. No. 2,990,182 and 3,095,200 are exceptionally cumbersome and totally unsuited for space use, both having unwieldy tape transport and head-positioning apparatus. The patent to Kumagai, 3,160,466 discloses a device of simpler design yet has material disadvantages when compared to the criteria for spacecraft recorders. In this device, the tape is stationary and a head and drive rollers are rotated to traverse the tape stack. It is apparent that inductive couplings or brushes must be used and that the tape must be deflected at a large angle to provide clearance for the rollers and head between the upper and lower tape stacks. Also, the head to tape interface is large because the tape as shown will tend to conform to the entire head surface. The result is head wear, tape fatigue and system unreliability. Kumagai describes his system as advantageous over others since it is possible to add further recording material during operation since the tape does not rotate. However, this feature is impractical in space use and accordingly, this system is unattractive in situations where long life and a high degree of reliability are required. The patent to Kuehnle U.S. Pat. No. 3,231,685 discloses a relatively simple technique for using a helical coil wrapped as a toroid in a recorder. This recorder, like the preceding prior art devices, uses a drive system totally unsuited for spacecraft use. A worm gear is used to rotate the toroid by meshing with a series of teeth located on the outside edge of the tape. This relatively crude drive scheme imposes a high degree of wear on the drive members and fails to provide adequate support for the helix at it's outside edges. Also, to insure proper contact, this scheme uses a guide to displace coils outward from the spindle to allow selective engagement of coils. Hence, tracking accuracy is impaired due to the lack of axial support for each of the coils. Also, the use of drive teeth on the outside edges eliminates the recording bands on the helix of largest diameter, and hence the greatest record area is unusable.

Accordingly, it is an object of the invention to provide a new and improved data-handling system.

It is a further object of the invention to provide a recorder that does not require separate feed and takeup reels.

Yet another object of the invention is to provide a recorder using low power and having a minimum of moving parts.

Another object of the invention is to provide a high environment recorder operable for extended periods under extreme conditions.

It is still another object of the invention to provide a recorder using a helical tape for mass data storage that overcomes the above-mentioned disadvantages of prior art devices.

In accordance with the present invention there is provided a helical recorder having only a single rotating part. The tape, would as a helix is firmly affixed at its ends to a drum. The tape is thereby constrained against movement in the absence of movement by the drum. Also, since each winding contacts the drum about the entirety of its circumferential length, movement due to centrifugal forces is minimized. The drum is affixed to a direct drive torquer such that each revolution of the output shaft produces a corresponding revolution of the drum. Hence, the drum and torquer are an integral unit, therefore, all system rotation is at a constant angular velocity.

Further, in accordance with the present invention the heads and separators are supported entirely by the tape, using guides and flexure members only to prevent rotational motion and allow movement in the axial direction. By this technique it is possible to guide the tape at the edge rather than drawing the whole surface of the tape across the recording head.

For a better understanding of the present invention, together with other and further objects thereof, reference is made to the following description taken in connection with accompanying drawings in which like numerals indicate the same elements.

Figure 1:
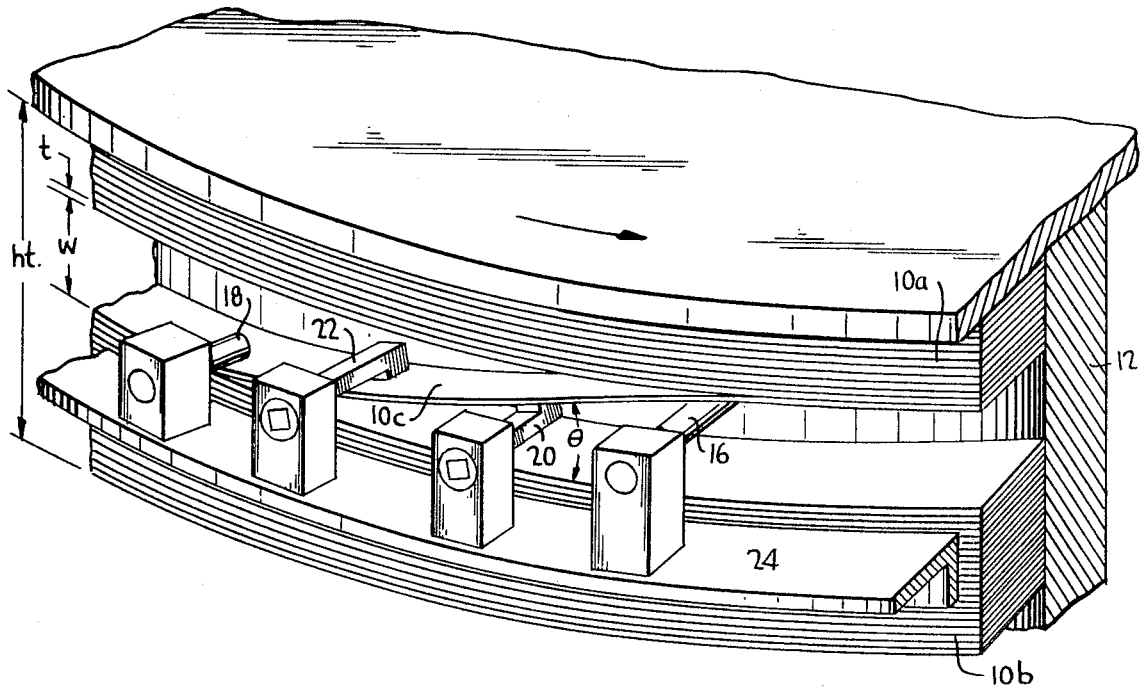
FIG. 1 is a schematic illustration of the operational scheme of the present invention.
Figure 5:
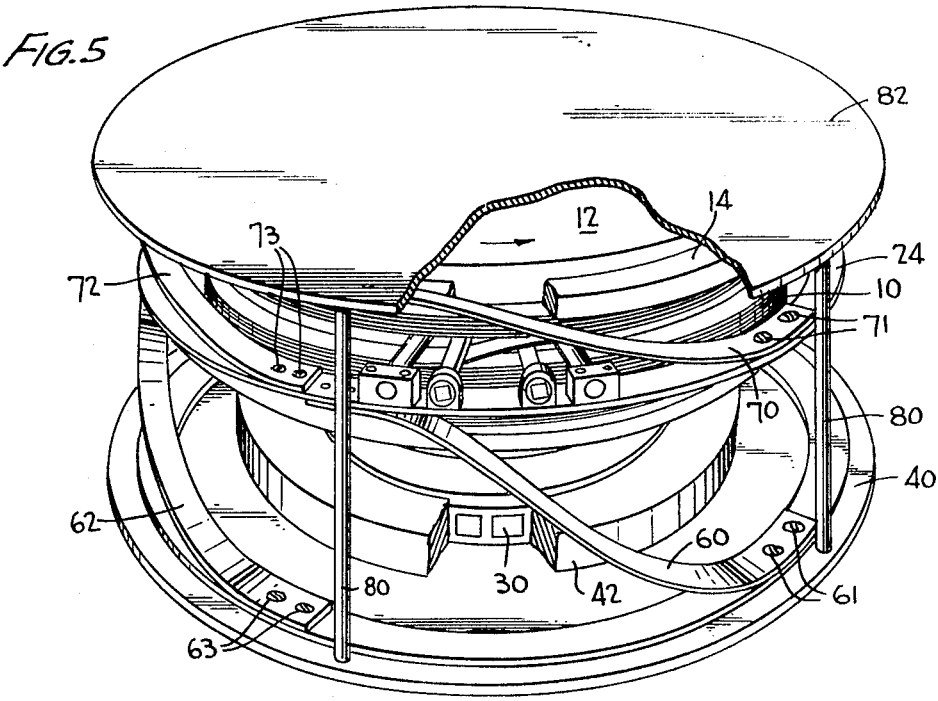

FIG. 4 is a side view of an alternative embodiment of the recorder using a different traverse arrangement, and FIG. 5 is a perspective view of still another embodiment of the recorder using a coil spring traverse system. Referring now to FIG. 1, there is schematically illustrated the principal of operation of this invention. A metal tape 10 is formed into a helical stack and wound directly on the drum 12. The substrate, typically BeCu alloy, can be fabricated into the helix by roll-forming, electroless disposition, flat rolling, hydrostatic forming, explosive forming or electro forming. The use of any nonmagnetic material is feasible, however, BeCu alloy is preferred, having been proven for space use in a number of applications. A typical example is BeCu alloy 25. The substrate must be nonmagnetic so that a coating with controlled magnetic properties can be applied, for example electroless NiCo.

The entire length of the tape is in contact with the drum 12 and therefore every turn is supported and driven. The entire tape assembly moves at a single rotational rate and has a small axial movement relative to the record-reproduce heads 20 and 22 equal to $t$, the tape thickness per revolution. The overall height, of the tape stack remains constant, equal to the number of layers of tape times the tape thickness plus $w$, the height of the separators 16 and 18 to allow sufficient clearance for the record/reproduce heads 20 and 22. The separators may be either fixed cylindrical or conical rollers to minimize the contact forces. The separator 16 contacts only the stack 10a to hold it in place and the separator 18 the lower stack 10b. Although these separators are shown as rollers, sliding contact, fixed separators may be used. Also, fixed separators employing bearing elements at the point of tape contact can be employed.

As the tape is rotated (shown counterclockwise), the separators 16 and 18 and the heads 20—22 move in a downward direction due to the archemides screw effect of the helix on this assembly. Tape passes from the unrecorded stack 10b to the stack 10a as the rotation continues. The tape, while wound and stored as a helix, must rise a distance $w$ sufficiently to clear the recording head at the active recording area 10c. In this transition region, the tape makes two deflections at angle 0, one leaving the stored stack 10b and after passing the heads, on returning to the stored stack 10a. Because $\theta$ is a small angle and the tape deflects only twice, the use of a metal tape, typically 0.002 inch, is possible. The drum may be rotated in either direction so that the heads may record going down and then playback going up or the head assembly traversed to its starting point to thereby playback data in the same direction as it was recorded. This process may obviously be reversed, e.g., recording up and playing back down.

The heads and separators are affixed to a traversing mechanism 24 that prevents lateral movement. This ring is attached to the complete assembly in a manner later described such that the heads 20—22 and separators 16—18 and completely supported in the axial direction by the tape 10. When the tape stack is traversed, several methods can be employed to prevent the heads from running off the tape track. An electronic end-of-tape-signal on the tape can be used to reverse the drive mechanism or, the end convolutions of the tape made closed such that the assembly rotates only on that layer until the drive mechanism is reversed. This latter technique is similar to that on the last bands on a record disc. Additionally, microswitches mounted on a column parallel to the axis of rotation with a trip lever on the traverse ring may be used.

Figure 2:
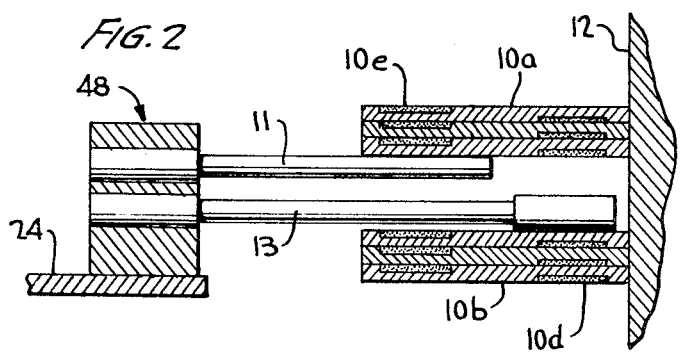
FIG. 2 is a schematic illustration of the head and guide interface at the tape.

FIG. 2 shows a separator arrangement wherein two separators from a single unit. The recording bands are 10e on the upper side and 10d on the lower side of the tape. The separators 11 and 13 are journaled for rotation in the mount 48 which is affixed to the traverse ring 24. The separator 11 contacts the lower side of the tape stack 10a but does not protrude into the stack to the point where it would contact the recording area 10d. The separator 13 contacts the upper side of the tape stack 10b and has a saddle taper to avoid contact with the outside recording band 10e. In this manner the upper and lower stacks are separated for head access yet, the recording bands are not contacted.

Figure 3:
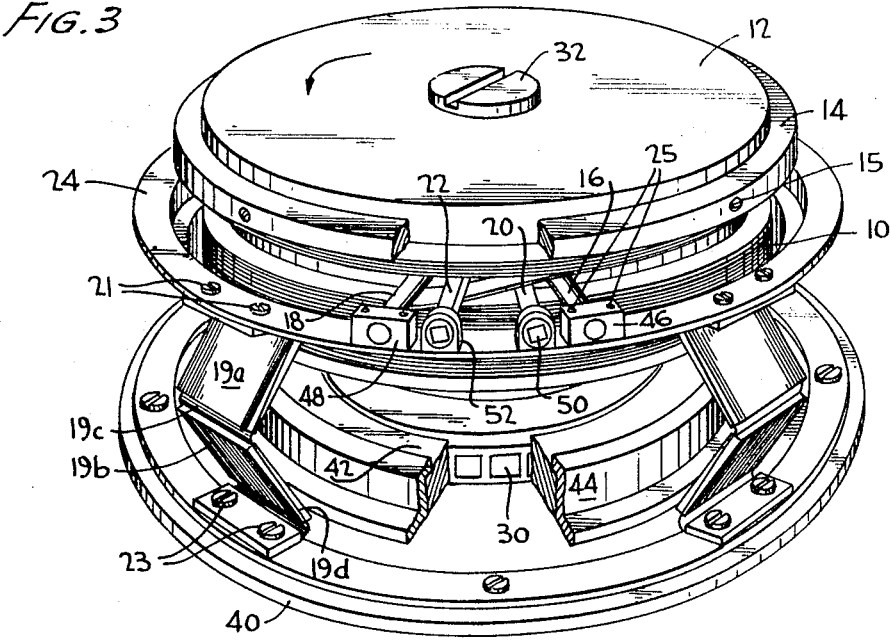
FIG. 3 is a perspective view of one embodiment of the recorder using a helical stack of tape.

FIG. 3 shows a preferred embodiment of a complete recorder assembly. The tape 10, is wound about the drum 12 and held in place by collar 14. The collar is mounted to the drum by a series of screws 15. Typically, the tape 10 could be approximately 100 feet having 120 turns on a 3.2 inch diameter drum. This provides for approximately 5.7 million bits of storage. It is apparent however, that not only the tape length, but also, the diameter of the drum and the width of the tape may be varied to provide three parameters by which increased storage per unit area may be accomplished. In a space environment where volume, in addition to weight, is a serious design consideration, this flexibility is an important improvement over prior art recorders.

The drum 12 is mounted for rotation by drive means 30 on shaft 32. This integral structure eliminates all belts, pulleys and their bearings, common to recorders having a reeling function. This system employs as few as two bearings, one at each end of the shaft 32, which sharply contrasts with the number required for a reel to reel-type recorder, about 28. The drive means, preferably a direct drive DC torquer uses a servo speed control, not shown, to maintain a constant rate of rotation. This servo speed control, phase locked to the spacecraft clock provides the capability of controlling the low-frequency torque variations of the drive motor and handling frictional or externally induced disturbances. The direct drive torquer is preferably an electronically commutated DC motor comprising only two parts, an armature 42 and a field assembly 30. The field assembly 30 becomes an integral part of the drum 12. This type of brushless DC motor has several important advantages for recorder use. There is no physical contact with the single moving part 30 and the elimination of brushes negates noise that may disturb the servo speed control at high rotational speeds. In a high environment, the elimination of wear considerations on the moving parts and sharp reduction in electrical noise make it especially attractive. Speed control is maintained by varying the current to the armature 42.

Although, the brushless torquer is shown, in FIG. 3 and 5, it is apparent that any conventional drive system, for example, a hysteresis synchronous motor with a drive belt system can be used where the criteria of operation are not as stringent as in high environments. As shown in FIG. 3, the drum 12 rests directly on the field assembly 30 of the torquer and mounted to the base 40 is the armature 42 attached to the base by a clamp 44. However, a multitude of configurations are possible.

For example, a second torquer may be mounted on the top of the drum and affixed to a support to provide a dual drive. Also, the field assembly could be mounted inside the drum 12 to drive the drum thereby reducing the total height of the recorder. In all these configurations the essential feature, direct drive of the drum, is maintained.

As shown in FIG. 3, the recorder uses a traversing system comprising a ring 24 and a plurality of flexible hinges 19. The hinges are comprised of two pieces 19a and 19b, the upper section 19a attached to the ring 24 by screws 21 and the lower section 19b attached to the base 40 by screws 23. The hinges have no capability to support the ring in the axial direction but maintain lateral support to traverse ring. As this ring moves up and down in response to tape rotation the hinge freely flexes about point 19c. The hinge material is a polyimide film such as Kapton. This material 19d is sandwiched in the elements 19a and 19b in a tapered manner such that at the bending point 19c the material is almost tangent with the edge of the hinge components to thereby provide a smooth bending point. Additional hinges and guides, not shown may be mounted as needed about the drum.

Affixed to the ring are two tape separators 16, 18 and two tape heads 20, 22. The separator 16 is journaled for rotation in support 46 and the separator 18 journaled in support 48. The supports are mounted to the traverse ring by a series of screws 25.

Tape heads 20, 22 are mounted in members 50 and 52 such that the head can be angularly adjusted to maintain head-totape tension. Accurate adjustment is necessary since this embodiment relies on sliding contact between the metal tape and head. If the heads are to be fixed on the traverse ring adjustment could be made by a relative displacement of the guides.

The recorder of FIG. 4 shows a modification of the traverse system shown in FIG. 3 and employs a brush-type drive system. The tape 10 is disposed about the drum 12 in the same manner shown in FIG. 3. Similarly, the magnetic ring 30 of the torquer is mounted on base 40. The drum is mounted for rotation about shaft 32 which is directly coupled to the armature 42.

In this embodiment, guides 60—62 are used in place of the hinges of FIG. 3. A traverse member 64 moves up and down the guides 60—62. Tape heads 20—22 are mounted on the traverse member 64 by the rotary mounts 50. The adjustment of the heads within these mountings maintains the proper head-to-tape interface. The tape head also serves as the separator such that contact is maintained at two points on the tape.

The recorder system of FIG. 5 shows another embodiment using a different traverse mechanism. The tape 10 is wrapped about the drum 12 and the torquer assembly 30 and 42 disposed in the same manner as shown in FIG. 3 as is the clamp (not shown). Also, the heads and guides are mounted on the traverse ring 24 in an identical manner to that shown in FIG. 3. In place of the hinges 19, a series of springs are used to constrain the traverse ring. Springs 60 and 62 along with a third spring (not shown) are fixed at one end to the base plate by a series of screws 61 and 63. The other ends of the springs are affixed to the lower side of the traverse ring 24 in a similar manner. A second tier of springs 70—72 and a third one not shown are affixed between upper surface of the traverse ring and mounting plate 82 by screws 71 and 73. The plate 82 is held in place by a series of posts 80. The springs are uniformly placed around the assembly and the tiers are stacked on top of each other. Although the use of three springs is described, it is apparent that a greater or fewer number can be used depending on spring length and stack height.

The springs are wholly unable to support the traverse ring in the axial direction so all support comes from the tape. The springs however, serve to constrain motion about the circumference of the stack although a minute and repeatable degree of twist is imposed on the traverse ring when the springs are fully extended. Although this can be tolerated, the use of sufficiently long springs reduces such motion. This system has certain advantages over the others disclosed. There are no sliding elements as in FIG. 4, hence, lubrication and problems of sticking are eliminated. There is no flexure about a point as in the hinge mechanism of the hinges in FIG. 3 therefore, problems of material fatigue are negligible.

A comparison of parameters between the recorder of this invention and a typical small spacecraft recorder under the same operational requirements indicates substantial savings in both weight and volume are feasible along with increased system reliability and flexibility. These specifications may be summarized:

| Specification | Helical recorder | Typical s./c. recorder |
| --- | --- | --- |
| Total storage | $5.7 \times 19^6$ | $5.9 \times 10^6$ |
| Packing density, bits/in | 2,000 | 2,000 |
| Record rate, bits/sec | 400 | 400 |
| Playback rate, bits/sec | 10,000 | 10,000 |
| Tape length, feet | [1] 120 | [2] 240 |
| Record tape speed, i.p.s | .2 | .2 |
| Playback tape speed, i.p.s | 5.0 | 5.0 |
| Bit error rate | [3] | [4] |
| Jitter, percent peak to peak | 3 | 3 |
| Record power, watt | 1 | 1 |
| Playback power, watts | 2 | 2 |
| Weight, pounds | 4.4 | 7.4 |
| Volume, in.³ | 130 | 183 |
| Design life, years | 3–5 | ½–1 |

[1] Both sides.
[2] One side.
[3] 1 in 10⁸.
[4] 1 in 10⁵.

It is clear from the chart that the real advantage of this invention or the prior art is the simplicity of design that will greatly enhance reliability. The complete elimination of polymer tapes is a major factor for long life in adverse environmental conditions. The use of a direct-drive torquer eliminates of all shafts, pulleys, bearing assemblies and capstans removes and the eccentricities of these machine elements which directly translate to jitter in the record and playback signal. The lower rotational speed of the drum that allows the use of dry film lubrication of the bearings. The helical configuration allows the recorder to be modified for random access to the drum, a technique impossible in reel-type recorders.

Having described our invention, We claim:

1. A recorder comprising:
   a. a cylindrical drum mounted for rotation about its axis of revolution;
   b. a length of strip tape coiled as a helix about said drum and being constrained by said drum to prevent relative movement between the tape and the drum;
   c. means for rotating said drum about its axis of revolution thereby rotating said tape;
   d. first and second record-reproduce means disposed such that said first record-reproduce means is adjacent the top surface of the tape to record a track thereon and said second record-reproduce means is adjacent the bottom surface of the tape to record a track thereon;
   e. means for separating said tape to provide access to the top and bottom surfaces of said tape, said separating means not contacting the recording tracks on either the top or bottom surfaces of the tape;
   f. means supported by the tape for mounting and maintaining the position of said first and second record-reproduce means in proximity to said tape, whereby, in response to tape rotation said first and second record-reproduce means and said separating means traverse the tape in a plane parallel to the axis of revolution.

2. The apparatus of claim 1 wherein the means for rotating the drum is a DC torque having its output shaft as an integral part of the drum.

3. The apparatus of claim 1, wherein said means for separating the tape includes first and second guides projecting into the tape at points preceding and following the location of said first and second record-reproduce means with respect to said tape.

4. The apparatus of claim 1 wherein said means for separating said tape comprises a plurality of rolling members, one of said rolling members in contact with the bottom surface of said tape and the other of said rolling members in contact with the top surface of said tape.

5. The apparatus of claim 1, further comprising a baseplate and wherein the means for maintaining the position of said record-reproduce means and said separating means includes a ring located circumferially about said tape and a flexible hinge connecting said ring to said plate.

6. The apparatus of claim 5 wherein said record-reproduce means and said separating means are mounted on said ring.

7. The apparatus of claim 1 further including a baseplate, a mounting plate disposed opposite the baseplate and wherein the means for maintaining the position of said record-reproduce means and said separating means includes a ring located circumferially about said tape, a first set of springs connecting said baseplate and said ring and a second set of springs connecting said ring and said mounting plate.

8. The apparatus of claim 7 wherein said record-reproduce means and said separating means are mounted on said ring.